United States Patent [19]
Delvaux et al.

[11] Patent Number: 5,360,771
[45] Date of Patent: Nov. 1, 1994

[54] LIGHT WEIGHT MINERAL FOAM AND PROCESS FOR PREPARING THE SAME

[75] Inventors: Pierre Delvaux, Bromptonville; Normand Lesmerises, Rock Forest; Daniel Poisson, Sherbrooke; Marcel Gouin, Deauville, all of Canada

[73] Assignee: Ceram SNA Inc., Sherbrooke, Canada

[21] Appl. No.: 16,889

[22] Filed: Feb. 12, 1993

[51] Int. Cl.$^5$ .............................................. C04B 38/00
[52] U.S. Cl. ........................................ 501/80; 501/84; 106/672; 252/62
[58] Field of Search ............. 106/605, 607, 672, 675; 501/80, 84, 85; 252/3, 62, 320, 321, 350, 351; 428/304.4, 312.2, 312.4, 313.7; 521/83; C04B 38/00

[56] References Cited

U.S. PATENT DOCUMENTS

| | | | |
|---|---|---|---|
| 3,148,996 | 9/1964 | Vukasovich | 106/672 |
| 3,661,603 | 5/1972 | Nicol . | |
| 3,989,534 | 11/1976 | Plunguian et al. | 106/675 |
| 4,207,113 | 6/1980 | Yoshino et al. | 501/84 |
| 4,341,561 | 7/1982 | Britt | 106/672 |
| 4,395,456 | 7/1983 | Jackson et al. | 501/85 |
| 4,596,834 | 6/1986 | Widener et al. | 106/672 |

FOREIGN PATENT DOCUMENTS 1381289 1/1975 United Kingdom .

Primary Examiner—Mark L. Bell
Assistant Examiner—Paul Marcantoni
Attorney, Agent, or Firm—Foley & Lardner

[57] ABSTRACT

Disclosed is a process for preparing a solid, light weight mineral foam which is stable during its preparation and during its subsequent curing and drying and which, thanks to its composition and the way it is prepared, can be injected in situ, substantially like a urethane foam. This foam has a density ranging from 10 to 65 lb/pi$^3$ and is made of 1 part by weight of a solution of phosphoric acid of given concentration in which is dissolved polyvinyl alcohol in such an amount as to make the solution viscous; from 0.03 to 6 parts by weight of wollastonite containing from 0.5 to 4% by weight of a carbonate salt; and from 0.2 to 10 parts by weight of water. The amount of water depends on the concentration of the solution of phosphoric acid and of the required density of the foam, it being understood that the more concentrated is the solution of phosphoric acid and/or the lower is the required density, the higher is the amount of water. The products made of such a foam are rigid and can be used for thermal and acoustic insulation.

10 Claims, No Drawings

LIGHT WEIGHT MINERAL FOAM AND PROCESS FOR PREPARING THE SAME

BACKGROUND OF THE INVENTION a) Field of the Invention:

The present invention relates to a light weight mineral foam composition and to a process for preparing the same.

b) Brief Description of the Prior Art:

To the Applicant's knowledge, there are presently three main processes for preparing mineral foams.

The first one of these processes is commonly known as process for preparing "chemical" foams. This process consists in generating gaseous bubbles by a chemical reaction into a mixture. This process is used in particular for preparing cellular concretes like those sold under the trademarks SIPOREX ® and YTONG ® by Internationalla Siporex AB, of Stockholm, Sweden. The composition which is used for preparing this concrete generally consists of a mixture of water, hydraulic cement of the Portland type, and fine granular material such as natural silica sand, to which is added a substance generating gas during mixing. Such a substance generating gas can be aluminum powder which, in the presence of the lime $(CaOH)_2$ contained in the concrete, reacts to form a calcium aluminate of formula $CaO.Al_2O_3$, and gaseous hydrogen which is generated within the composition and transforms the same into a foam. The product that is so obtained is subjected to curing until the concrete is set and then to a treatment with saturated vapour in an autoclave. The final product has a density ranging from 25 to 30 $lb/pi^3$.

The second process known to the Applicant is commonly known as process for preparing "mechanical" foams. This process consists in mixing or mechanically stirring a suspension of the basic components of the foam in water, in the presence of a foaming agent. This process which is used in particular for the production of gypsum panel like those sold under the trademark GYPROC ® consists in molding between two sheets of cardboards a mineral foam obtained by mechanical stirring of a mixture of water, gypsum and a suitable foaming agent. There are many other applications of this process for preparing "mechanical" foams. By way of example, reference can be made to British patent No. 1,381,289 which discloses a process for preparing a magnesium concrete foam. Reference can also be made to U.S. Pat. No. 3,661,603 which discloses a process for preparing a foam of asbestos fibers with a cementitious material.

The third process known to the Applicant for the preparation of mineral foams, consists in forming a foam, adding this foam to a suspension of other components in water, and homogenizing the resulting mixture. An example of known products prepared by this process are the structural and non structural concretes sold under the trademark MEARLCRETE ® by Mearl Corporation of New Jersey. The process used by this company consists in mixing a foam obtained from a solution of proteins with a mortar or a concrete made from hydraulic cement in order to obtain, depending on the amount of foam that is added, different products that are classified in three different groups according to the densities, the first group containing the product of a density ranging from 16 to 27 $lb/pi^3$ the second group those of a density ranging from 27 to 50 $lb/pi^3$ and the third group those of a density ranging from 50 to 120 $lb/pi^3$.

The light weight mineral foams that are prepared according to the three above-mentioned processes and have a density ranging from 10 to 40 $lb/pi^3$ are useful in particular for thermo-insulation under ambient temperature conditions, acoustic absorption and refractory insulation at high temperature. Obviously, in the latter case, the selection of the substances used to form of the foam and of the kind of binders that hold the same together, is essential.

OBJECTS OF THE INVENTION

A first object of the present invention is to provide a process for preparing a mineral foam by generation of gaseous $CO_2$, in which the mineral binder that is formed is of the phosphate type and has refractory properties.

In this connection, it is worth mentioning that it has already been suggested to prepare refractory binders by reacting phosphoric acid with a mineral containing reactive magnesium cations (see, for example, U.S. patent application Ser. No. 07/991,821 filed on Dec. 16, 1992 in the name of the Applicant). However, the products that were prepared so far from such a refractory binder, are not foams.

Another object of the invention is to provide a process for preparing a foam of the above-mentioned type, in which the substances used as starting materials are selected in such a manner as to obtain a foam in which the generated bubbles are of controlled dimensions and are uniformly distributed.

A further object of the invention is to provide a mineral foam which is stable during its preparation and during its subsequent curing and drying and which, as a result its composition and the way it is prepared, can be injected in situ, substantially like a urethane foam.

still another object of the invention is the products that are made of such a mineral foam, which products are rigid, of very low density and useful in particular as the thermal or acoustic insulation, and whose characteristics, in particular their ability to be used at temperatures of 1200° C., depend on the kind of substances used as starting materials for their preparation, and the kind of binders that are obtained therefrom.

SUMMARY OF THE INVENTION

In accordance with the present invention, there is provided a process for preparing a light mineral foam that is free of hydraulic cement and has a density ranging from 10 to 65 $lb/pi^3$ this process comprising the steps of:

a) heating a solution of phosphoric acid of a given concentration and dissolving polyvinyl alcohol into the heated solution in such an amount as to make it viscous;

b) mixing from 0.03 to 6 parts by weight of wollastonite containing from 0.5 to 4% by weight of a carbonate salt, with from 0.2 to 10 parts by weight of water; and c) contacting 1 part of the solution of phosphoric acid in which is dissolved polyvinyl alcohol, as was obtained in step (a), with the mixture obtained in step (b), said contact causing phosphoric acid to react with both the wollastonite and the carbonate which is converted into gaseous $CO_2$ to form said foam, In step (b), the amount of water that is used depends on the concentration of the solution of phosphoric acid and of the required density of the foam, it being understood that the more concentrated is the solution of phosphoric acid and/or the lower is the density to be obtained, the higher should be the amount of water.

In practice, as soon as the mixture of carbonate-containing wollastonite and water comes into contact with the solution of phosphoric acid in which is dissolved polyvinyl alcohol preferably in the form of fibers, there is immediate formation of a foam due to the generation of gaseous $CO_2$ by reaction of the carbonate salt contained in the wollastonite with the phosphoric acid.

In accordance with the invention, there is also provided a solid light weight mineral foam that is free of hydraulic cement and has a density ranging from 10 to 65 lb/pi$^3$ this foam being made of:
a) 1 part by weight of a solution of phosphoric acid of given concentration in which is dissolved polyvinyl alcohol in such an amount as to make said solution viscous;
b) from 0.03 to 6 parts by weight of wollastonite containing from 0.5 to 4% by weight of a carbonate salt; and
c) from 0.2 to 10 parts by weight of water. Once again, the amount of water depends on the concentration of said solution of phosphoric acid and of the required density of the foam, it being understood that the more concentrated is the solution of phosphoric acid and/or the lower is the required density, the higher should be the amount of water.

Preferably, the solid, light weight mineral foam according to the invention is made of:
a) 1 part by weight of a solution of phosphoric acid having a concentration of about 50% in which is dissolved polyvinyl alcohol fibers in an amount ranging from 0.03 to 0.11 parts by weight per part of solution, so as to make the solution viscous;
b) about 3.3 parts by weight of wollastonite containing about 1.8% by weight of calcium carbonate;
c) about 3.3 parts by weight of water, and, whenever desired;
d) at least one additive selected from the group consisting of minerals containing aluminum or magnesium cations, light weight additives and refractory additives.

Preferably, use can be made of the wollastonite sold under the trademark NYAD 400 ®, which contains about 1.8% by weight of calcium carbonate in its natural state. It must be understood however that use can also be made of wollastonite to which carbonate is added.

When use is made of wollastonite NYAD 400 which contains calcium carbonate in its natural state, use can also be made of 0 to 6.6 parts by weight of wollastonite like the one sold under the trademark NYAD G ®, which contains traces of $CaCO_3$ only in order to adjust the density of the final product.

The mineral foam according to the invention may also contain mineral containing cations that may react with the phosphoric acid, such as the synthetic fibrous forsterite sold by the Applicant under the trademark FRITMAG ®, which contains $Mg^{2+}$ as reactive cation, or the mineral known as muscovite, which contains $Al^{3+}$ as reactive cation.

The mineral foam according to the invention may also contains light density additives such as perlite, or refractory additives such as graphite or ceramic fibers.

The mineral foam according to the invention and the products made from the same have good mechanical characteristics, and good thermal insulation properties, and may be used up to 1200° C. The mineral foam according to the invention is also very interesting in that it can be injected in situ, substantially in the same way as urethane foam is injected, thereby making it very versatile in use.

DETAILED DESCRIPTION OF THE INVENTION a) Preparation of the solution of phosphoric acid in which is dissolved polyvinyl alcohol (PVA)

The first step of the process according to the invention as briefly disclosed hereinabove consists in dissolving polyvinyl alcohol into hot phosphoric acid in order to "mask" part of the acidic functions of phosphoric acid and obtain a solution of suitable viscosity.

This can be done in different manners.

By way of examples, different solutions of phosphoric acid and polyvinyl alcohol were prepared as follows, using PVA granules sold by HOECHST under the trademark MOWIOL ® as starting material.

The phosphoric acid was used as starting material was a commercially available phosphoric acid solution having a concentration of 85%. This acid was diluted in water to reduce its concentration to 50%. Then, it was heated to 90° C.

Table 1 gives the amount of PVA of the trademark MOWIOL that were added. Dissolution of the granules into the 50% phosphoric acid solution at 90° C. was carried out in a container provided with a magnetic bar stirrer for about 10 minutes. The solutions that were so obtained, were cooled to room temperature and were tested in order to determine their reactivity with the minerals subsequently used in the process according to the invention. These solutions were also tested in order to determine their viscosity.

The reactivity of the solution of phosphoric acid with MOWIOL PVA with respect to wollastonite was determined as follows: 0.1 g of wollastonite was suspended into 0.2 g of the $H_3PO_4$ solution containing PVA dissolved at a given concentration, and with 50 ml of distilled water. As soon as these substances were mixed, a chronometer was started. After 15 minutes, the entire suspension was titrated with an automatic titration apparatus sold under the tradename 672 TITRO-PROCESSOR by METHROM. The product that was used for titration was a conventional solution of NaOH 0.1M.

The viscosity of the solution was measured by a rheometer sold by HAAKE under the tradename RV-20.

For the purpose of comparison, the reactivity of the same solution of phosphoric acid containing MOWIOL PVA with respect to the fibrous synthetic forsterite sold by the Applicant under the trademark FRITMAG, was also determined.

TABLE I

| PROPERTIES OF MOWIOL PVA/$H_3PO_4$ SOLUTIONS | | | | |
|---|---|---|---|---|
| FORMULATION (kg) | | | CHEMICAL REACTIVITY (% of acid neutralized) | |
| $H_3PO_4$ (50%) | MOWIOL PVA | VISCOSITY (cP) | FRITMAG | WOLLASTO-NITE G |
| 1 | 0.00 | — | 60 | 30 |
| 1 | 0.006 | 10 | 40 | 6 |
| 1 | 0.03 | 200 | 40 | 5 |
| 1 | 0.06 | 2500 | 40 | 0 |
| 1 | 0.09 | — | — | — |
| 1 | 0.11 | 55000 | — | — |

As can be seen, the addition of MOWIOL PVA granules into the solution of phosphoric acid substantially increases the viscosity of the solution. It also delays the reaction of this solution with FRITMAG or wollastonite. This masking effect is particularly efficient in the case of wollastonite.

On the other hand, for the same amount of starting materials, the degree of neutralization of phosphoric acid by FRITMAG is twice the one of wollastonite.

By way of other examples, other solutions of phosphoric acid were prepared in substantially the same manner, using the PVA fibers sold under the trademark MEWLON AA by UNITIKA. Different amounts of acid and PVA were used and the acidic reactivity and viscosity of the resulting solutions are reported in Table II.

TABLE II

PROPERTIES OF MEWLON PVA/$H_3PO_4$ SOLUTIONS

| FORMULATION (kg) | | VISCOSITY (cP) | CHEMICAL REACTIVITY (% of acid neutralized) | |
|---|---|---|---|---|
| $H_3PO_4$ (50%) | MEWLON PVA | | FRITMAG | WOLLASTONITE G |
| 1 | 0.00 | — | 60 | 30 |
| 1 | 0.006 | 10 | 40 | 8 |
| 1 | 0.03 | 100 | — | — |
| 1 | 0.06 | 1900 | 40 | 5 |
| 1 | 0.09 | 5300 | — | — |
| 1 | 0.11 | 21500 | 40 | 0 |

As can be seen, the solutions of $H_3PO_4$ in which were dissolved the PVA fibers of trademark "MEWLON" had a high viscosity. However, for the same amount of polymer, the viscosity that was obtained was lower than the one obtained with the PVA of trademark MOWIOL. Masking of the acidic functions of phosphoric acid was however as efficient as in the first case.

In both cases, when the amount of PVA becomes higher than 0.11 by weight, the viscosity becomes very high. This may become a problem inasmuch as a too high viscosity may prevent $CO_2$ bubbles from forming in a regular manner and, accordingly, the foam from having a constant density. Accordingly, it is preferred to work with less than 0.11 part by weight of PVA even though, in some cases where the quality of the final product is not really important, use could be made of little more than 0.11 part by weight of PVA.

b) Preparation of the mixture of wollastonite, water and optional minerals and/or additives The second step of the process according to the invention consists in mixing together the other components that are necessary to obtain the required mineral foam.

This second step is very simple to carry out. It merely consists in mixing all the components together in a mixer in order to form the required mixture.

If desired, in addition to wollastonite and water, one or more additional mineral and/or additive may be added to the mixture for different purposes that will be explained hereinafter.

c) Formation of the foam

The last step of the process according to the invention consists in mixing the solution obtained in the first step (a) explained hereinabove with the mixture obtained in the second step (b).

The basic idea of the invention is to put into contact wollastonite, which is a mineral containing cations capable of forming bonds with phosphoric acid and which, in accordance with the invention, also contains a given amount of carbonate, with the solution of phosphoric acid to which was added PVA, in order to generate a foam of any required density.

The binder of the resulting foam is made by reaction of the phosphate anions of the phosphoric acid with the cations of the carbonate salt, such as calcium, and the other reactive cations that may be contained in wollastonite. The binder may also be formed by reaction of phosphoric acid with other reactive cations present in the mixture, such as aluminum and magnesium, that are provided by the optional mineral(s) added to the wollastonite.

Advantageously, use can be made of the wollastonite sold under the trademark NYAD 400 or of the wollastonite sold under trademark NYAD G by NYCO.

The wollastonite NYAD 400 is particularly interesting, because it naturally contains about 1.8% by weight of calcium carbonate ($CaCO_3$) in its natural state. Moreover, this wollastonite has a granulometry and physico-chemical properties that are perfectly compatible with the required foam.

The wollastonite of trademark NYAD G has also a granulometry and physico-chemical properties that are suitable. However, its content in calcium carbonate is very low (about 0.2%). Accordingly, when use is made of this wollastonite, it is compulsory to add a carbonate salt to the mixture in order to obtain the required generation of $CO_2$.

As can be understood, a mixture of wollastonite NYAD 400 and NYAD G in any given ratio can be used to adjust the amount of carbonate as is required. Thus, the generation of gaseous $CO_2$ can be easily controlled to obtain mineral foams of different densities. It will be understood however that, instead of using a mixture of these two wollastonites, use could be made of wollastonite containing a very low concentration of carbonate or no carbonate at all, such as the one sold under the trademark NYAD G, provided that the required amount of carbonate salt be added and mixed thereto.

As soon as the acid solution is in contact with the mixture of wollastonite, carbonate and water, the reaction starts and the foam is immediately formed. This makes the invention particularly useful for the injection of the mineral foam in situ, since the kinetics of reaction is, from a practical standpoint, substantially identical to the one of a urethane foam.

d) Example of reduction to practise

The way the process according to the invention can be carried out will now be described in greater detail, referring to a specific composition for use to obtain the foam, for the purpose of simplicity.

A solution of phosphoric acid and PVA was prepared by dissolving at 90° C., 100 g of MEWLON AA fibers produced by UNITIKA within 1.7 kg of phosphoric acid having a concentration of 50%.

The relative amount of the different components that were subsequently processed were as follows:

3.3 parts of wollastonite NYAD 400;

3.3 parts by weight of water; and 1 part by weight of the solution of $H_3PO_4$ with MEWLON AA PVA fibers.

The wollastonite NYAD 400 was put in suspension into water within a HOBART ® mixer. The solution of phosphoric acid in admixture with MEWLON AA fibers was added to the suspension. Surprisingly, there was immediate formation of a foam with bubbles of regular dimensions uniformly distributed therein.

The time of formation of the foam was of about 1 minute and the resulting product was dimensionally stable. This foam remained flexible for about 10 minutes, and then started to harden.

After a period of time of about 30 minutes, the product was sufficiently rigid to be handled. After heating at 100° C. for 4 hours to eliminate excess of water, the foam had a density of 15 to 20 lb/pi$^3$. An examination made visually and by means of optical microscope showed that the bubbles had the same dimension, the same aspect and the same uniform distribution than during the formation of the foam.

The thermal post treatment of the foam was made as follows: drying at 110° C. to remove water, optionally followed by heating at 180° C. to remove crystallisation water of the phosphates, and by heating at 375° C. to stabilize the phosphates. If needed, heating at 475° C. can also be made to remove the traces of organic substances due to the presence of PVA.

e) Miscellaneous

In accordance with the invention, the final density of the foam depends on the two following parameters:

1—the amount of generated $CO_2$, which itself depends on the amount of carbonate salt and, accordingly, of the amount of wollastonite when the wollastonite contains $CaCO_3$; and 2—the amount of water, which itself depends on the concentration of phosphoric acid and the concentration of the suspension of wollastonite, it being understood that the more concentrated is the solution of the phosphoric acid and/or the lower is the required density, the higher should be the amount of water.

It is suspected that the starting substances and their reactive amount have the following effects and advantages.

The addition of PVA into the phosphoric acid solution permits to control the chemical reaction of this acid with carbonate and wollastonite. By adequately adjusting the viscosity of the solution, it becomes possible to keep the structure of the stable until the mineral binder is formed.

The concentration of the solution of $H_3PO_4$ may range from 40 to 85%. However, it is preferably equal to 50%. When the concentration of the acid solution is lower than 40%, the viscosity obtained by addition of PVA is too low and the resulting foam may be heterogeneous.

In order to provide a suitable amount of water into the foam to obtain a resulting product having a density ranging from 10 to 65 lb/pi$^3$ it is compulsory to add from 0.2 to 10 parts by weight of water to wollastonite. When use is made of a phosphoric acid solution having a concentration of 85%, the addition of 10 parts by weight of water permits to obtain a product having a density of about 10 lb/pi$^3$. When use is made of a 40% phosphoric acid solution, the addition of 0.2 part by weight of water permits to obtain a product having a density of about 65 lb/pi$^3$.

The concentration of PVA dissolved into the $H_3PO_4$ solution is preferably ranging from 0.03 to 0.11 part by weight, per one part of phosphoric acid solution at 50%, even though this concentration of PVA may, under certain circumstances, ranges from 0.001 to 0.14 part by weight. Preferably, this concentration of PVA is equal to 0.06 part by weight.

It has been noticed by the Applicant that suitable adjustment of the amount of wollastonite NYAD 400 with respect to the amount of wollastonite NYAD G, i.e. the wollastonite containing carbonate salt with respect to the one containing no carbonate salt, permits to obtain mineral foams of different densities, wherein, in each case, the bubbles are always of regular dimensions and are uniformly distributed.

Minerals can be added to the basic composition disclosed hereinabove, as a source of reactive cations, in order to provide some requested properties to the final product. However, it is compulsory that the physicochemical properties of the selected minerals, their granulometry and the amount that are being used do not cause the foam structure to collapse during its hardening and drying. Minerals that were tested with success by the Applicant are, in particular, those that are sources of magnesium cations such as the fibrous synthetic olivine sold by the Applicant under trademark FRITMAG, and those that are sources of aluminum cations, such as muscovite.

The composition disclosed hereinabove can be used as such. However, it can also be used as a matrix for light weight additives, such as expanded perlite, or of refractory additives, such as graphite or ceramic fibers, in order to mechanically reinforce the final product.

The following non-limitative examples will be given hereinafter in order to better understand the invention.

EXAMPLE 1

1 kg of 85% concentrated phosphoric acid $H_3PO_4$ were diluted within 0.7 kg of water and heated to 90° C. Stirring was made with a magnetic bar stirrer. 100 g of PVA fibers of trademark MEWLON AA sold by UNITIKA of Kobe, Japan, were subsequently added to the solution. The mixture was allowed to cool down after complete dissolution of the fibers (10 to 15 minutes)

The solution that was so obtained was used for preparing the following samples.

a) 0.4 kg of the PVA/$H_3PO_4$ solution prepared as disclosed hereinabove was added to a suspension containing 1.3 kg of wollastonite of trademark NYAD 400 (NYCO) and 1.3 kg of water. A thick foam immediately formed, which was poured into a square 2"×12"×12" of polyethylene. The foam was let harden for 15 to 20 minutes. Then, the resulting plate was unmolded. This plate was dried at 100° C. within an oven.

b) 0.4 kg of the PVA/$H_3PO_4$ solution prepared as disclosed hereinabove was added to a suspension containing 0.975 kg of wollastonite NYAD 400 (NYCO), 0.325 of wollastonite NYAD G (NYCO) and 1.3 kg of water. A thick foam immediately formed, which was poured into a polyethylene mold of the same shape and dimension as above. Unmolding was made after 15 to 20 minutes of hardening. The resulting plate was dried at 100° C. in an oven.

c) 0.4 kg of the PVA/$H_3PO_4$ solution prepared as disclosed hereinabove was added to a suspension containing 0.650 kg of wollastonite NYAD 400 (NYCO), 0.650 kg of wollastonite NYAD G (NYCO) and 1.3 kg of water. A thick foam was immediately formed, which was poured into polyethylene mold of the same shape and dimension as above. Unmolding was made after 15 to 20 minutes of hardening. The resulting plate was dried at 100° C. in an oven.

d) 0.4 kg of the PVA/$H_3PO_4$ solution prepared as disclosed hereinabove was added to a suspension containing 0.325 kg of wollastonite NYAD 400 (NYCO), 0.975 kg of wollastonite NYAD G (NYCO) and 1.3 kg of water. A thick foam immediately formed, which was poured into a polyethylene mold of the same shape and dimension as above. Unmolding was made after 15 to 20 minutes of hardening. The resulting plate was dried at 100° C. in an oven.

The properties of the samples that were so obtained are reported in Table III. The K factor, i.e. the thermal conductivity, was measured with the apparatus of trademark RAPID-K METER sold by HOLOMETRIX according to the ASTM C-518 standard. The density and the compression strength were measured according to the following standards: ASTM E605 and ASTM C165. The maximum temperature of use was also measured according to the following standard: ASTM C447.

Table III shows that the ratio of wollastonite 400 to wollastonite G determines the physical properties of the foams that were formed. Increase in the amount of wollastonite G which contains a few amount of carbonates only, reduces the formation of bubbles. The density of the resulting product is then increased, which causes an increase in the thermal conductivity and compression strength.

Because, wollastonite is a refractory fiber, the maximum temperature of use of all the plates that were so formed was close to 1200° C.

also measured according of the following standard: ASTM C447.

Table IV shows that it is possible to replace the wollastonite NYAD 400 by precipitated calcium carbonate in order to obtain a product which is substantially identical. However, the distribution of the bubbles and their dimensions are less regular than in the product of example 1. Moreover, the foam that was produced was less stable and had a tendency to shrink before final hardening.

EXAMPLE 3

A solution of PVA fibers dissolved in phosphoric acid was prepared as in example 1. This solution was used for preparing the following samples:

a) 0.84 kg of the $PVA/H_3PO_4$ solution was added to a suspension containing 0.7 kg of wollastonite NYAD 400, 2.8 kg of wollastonite NYAD G, 0.35 kg of FRITMAG and 1.5 kg of water.

b) 0.84 kg of the $PVA/H_3PO_4$ solution was added to a suspension containing 0.7 kg of wollastonite NYAD 400, 2.8 kg of wollastonite NYAD G, 0.175 kg of cryogenic perlite sold by W. R. GRACE and 1.5 kg of water.

c) 0.84 kg of the $PVA/H_3PO_4$ solution was added to a suspension containing 0.7 kg of wollastonite NYAD 400, 2.8 kg of wollastonite NYAD G, 0.525 kg of muscovite sold under trademark ALSI-

TABLE III

| PROPERTIES OF WOLLASTONITE FOAMS | | | | |
|---|---|---|---|---|
| RATIO WOLLASTONITE 400 / WOLLASTONITE G | DENSITY $lb/ft^3$ | THERMAL CONDUCTIVITY $\frac{BTU \cdot in}{°F \cdot hr \cdot ft^2}$ | COMPRESSION (psi) | MAXIMUM TEMPERATURE (°C.) |
| 1:0 | 12 | 0.38 | 8 | 1200 |
| 3:1 | 16 | 0.45 | 9 | 1200 |
| 1:1 | 21 | 0.59 | 24 | 1200 |
| 1:3 | 40 | 0.95 | 174 | 1200 |

EXAMPLE 2

A solution of PVA fibers dissolved in phosphoric acid was prepared as in example 1. 0.4 kg of this solution was mixed with 1.3 kg of wollastonite NYAD G (NYCO), 1.3 kg of water and 5 g of precipitated $CaCO_3$ (Fisher Scientific). A thick foam formed immediately, which was cast in a square 2"×12"×12" mold made of polyethylene. Unmolding was made after 15 to 20 minutes of hardening. The obtained plate was dried at 100° C. in an oven.

The properties of the sample that as was obtained are reported in Table IV.

BRONZ WG by PRESCOTT CANADA and 1.5 kg of water.

d) 0.84 kg of the $PVA/H_3PO_4$ solution was added to a suspension containing 0.7 kg of wollastonite NYAD 400, 2.8 kg of wollastonite NYAD G, 0.7 kg of graphite sold under the trade reference 5514 by SUPERIOR GRAPHITE and 1.5 kg of water.

e) 0.84 kg of the $PVA/H_3PO_4$ solution was added to a suspension containing 0.7 kg of wollastonite NYAD 400, 2.8 kg of wollastonite NYAD G, 0.14 kg of ceramic fibers sold under the trade reference No. 8 by THERMAL CERAMICS of Argentina, Ga. and 1.5 kg of water.

TABLE IV

| PROPERTIES OF CARBONATE FOAM | | | | |
|---|---|---|---|---|
| RATIO CALCIUM CARBONATE / WOLLASTONITE G | DENSITY $lb/ft^3$ | THERMAL CONDUCTIVITY $\frac{BTU \cdot in}{°F \cdot hr \cdot ft^2}$ | COMPRESSION (psi) | MAXIMUM TEMPERATURE (°C.) |
| 1:260 | 44 | 1.0 | 148 | 1200 |

The factor K, i.e. the thermalconductivity was measured with the apparatus of trademark RAPID-K METER sold by HOLOMETRIX (ASTM C-518). The density and the compression strength were measured according to the following standards: ASTM E605 and ASTM C165. The maximum temperature of use was Unmolding of the samples was made after 15 to 20 minutes hardening. The plates that were so obtained were dried at 100° C. in an oven.

The properties of the samples that were so obtained are reported in table V.

TABLE V

PROPERTIES OF CHARGES FOAMS

| CHARGE | DENSITY lb/ft³ | COMPRESSION (psi) | MAXIMUM TEMPERATURE (°C.) |
|---|---|---|---|
| Fritmag ® | 56 | 230 | 1100 |
| Perlite | 50 | 365 | 1100 |
| Muscovite | 57 | 515 | 1100 |
| Graphite | 55 | 355 | 1200 |
| Ceramic Fibers | 50 | 470 | 1200 |

The density and the compression strength were measured according to the following standards: ASTM E605 and ASTM C165, respectively. The maximum temperature of use was also measured according to the following standard: ASTM C447.

Table V shows that the addition of a refractory additive to the product increases its mechanical strength without affecting significantly the thermoresistance of the foam.

What is claimed is:

1. A solid, light weight mineral foam having a density ranging from 10 to 65 lb/pi³, said foam consisting essentially of:
   a) 1 part by weight of solution of phosphoric acid in which is dissolved polyvinyl alcohol in such an amount as to make said solution viscous;
   b) from 0.03 to 6 parts by weight of wollastonite containing from 0.5 to 4% by weight of a carbonate salt; and
   c) from 0.2 to 10 parts by weight of water, said amount of water depending on the concentration of said solution of phosphoric acid and of the required density of said foam, it being understood that the more concentrated is the solution of phosphoric acid or the lower is the required density, the higher is the amount of water.

2. The mineral foam of claim 1, wherein said carbonate salt is calcium carbonate and the percentage of said calcium carbonate contained in said wollastonite is equal to about 1.8%.

3. The mineral foam of claim 1, wherein the concentration of said solution of phosphoric acid is equal to about 50% and said amount of polyvinyl alcohol dissolved in said solution ranges from 0.03 to 0.11 parts by weight.

4. A solid, light weight mineral foam having a density ranging from 10 to 65 lb/pi³, said foam consisting essentially of:
   a) 1 part by weight of solution of phosphoric acid having a concentration of about 50%, in which is dissolved polyvinyl alcohol in an amount ranging from 0.03 to 0.11 parts by weight per part of solution;
   b) about 3.3 parts by weight of wollastonite containing about 1.8% by weight of calcium carbonate; and
   c) about 3.3 parts by weight of water.

5. A solid, light weight mineral foam having a density ranging from 10 to 65 lb/pi³, said foam consisting essentially of:
   a) 1 part by weight of solution of phosphoric acid in which is dissolved polyvinyl alcohol in such an amount as to make said solution viscous;
   b) from 0.03 to 6 parts by weight of wollastonite containing from 0.5 to 4% by weight of a carbonate salt;
   c) from 0.2 to 10 parts by weight of water, said amount of water depending on the concentration of said solution of phosphoric acid and of the required density of said foam, it being understood that the more concentrated is the solution of phosphoric acid or the lower is the required density, the higher is the amount of water; and
   d) at least one additive selected from the group consisting of synthetic fibrous forsterite, muscovite, perlite and a refractory additive;
   wherein said additive is in the amount from 4 to 20 parts per 100 parts of wollastonite.

6. A solid, light weight mineral foam having a density ranging from 10 to 65 lb/pi³, said foam consisting essentially of:
   a) 1 part by weight of solution of phosphoric acid having a concentration of about 50%, in which is dissolved polyvinyl alcohol in an amount ranging from 0.03 to 0.11 parts by weight per part of solution;
   b) about 3.3 parts by weight of wollastonite containing about 1.8% by weight of calcium carbonate; and
   c) about 3.3 parts by weight of water; and
   d) at least one additive selected from the group consisting of synthetic fibrous forsterite, muscovite, perlite, graphite and ceramic fibers;
   wherein said additive is in the amount from 4 to 20 parts per 100 parts of wollastonite; and, wherein if said additive is ceramic fibers said ceramic fibers are suitable for use in thermal and acoustical insulation and are capable of withstanding temperatures as high as 1200° C.

7. The mineral foam of claim 5 wherein said at least one additive consists of synthetic fibrous forsterite.

8. The mineral foam of claim 5, wherein said at least one additive consists of muscovite.

9. The mineral foam of claim 5, wherein said at least one additive consists of perlite.

10. The mineral foam of claim 5, wherein said at least one additive consists of a refractory additive.

* * * * *